United States Patent [19]
Caiati et al.

[11] 3,781,824
[45] Dec. 25, 1973

[54] SOLID STATE CRASH RECORDER

[75] Inventors: Frank P. Caiati, Bloomfield Hills; David C. Wight, Romeo, both of Mich.

[73] Assignee: General Motors Corporation, Detroit, Mich.

[22] Filed: Nov. 20, 1972

[21] Appl. No.: 308,005

Related U.S. Application Data

[63] Continuation-in-part of Ser. No. 249,918, May 3, 1972.

[52] U.S. Cl............. 340/172.5, 340/22, 346/33 R, 307/221 R
[51] Int. Cl.......................................... G11c 19/00
[58] Field of Search.............. 340/172.5, 173 R, 340/22; 307/9, 10, 221 R; 346/33 EC, 44; 235/92 SH

[56] References Cited
UNITED STATES PATENTS

| | | | |
|---|---|---|---|
| 3,683,403 | 8/1972 | Okino............................ | 346/33 EC |
| 3,710,081 | 1/1973 | Apitz........................ | 235/150.24 X |

*Primary Examiner*—Paul J. Henonon
*Assistant Examiner*—Mark Edward Nusbaum
*Attorney*—C. R. Meland et al.

[57] ABSTRACT

A solid state crash recorder in which various vehicle conditions such as acceleration and speed are continually monitored and converted into digital form with the magnitude of the conditions monitored being cyclically stored in a plurality of registers. Upon the sensing of a crash, the contents of a portion of the registers corresponding to certain vehicle conditions, such as speed and low level acceleration, are maintained so as to provide information relating to pre-crash conditions while information relating to other conditions, such as high acceleration, are continually fed to the remaining registers with the output thereof being routed, when a crash is sensed, to a memory circuit. In this manner, pre and post crash information relating to those conditions are memorized. Subsequently, the contents of the registers containing only precrash information are routed to the memory circuit which memorizes the precrash conditions represented thereby. When the contents of all the registers have been memorized in the memory circuit, the power supplied to the system is disabled so as to prevent further inputs to the crash recorder.

3 Claims, 15 Drawing Figures

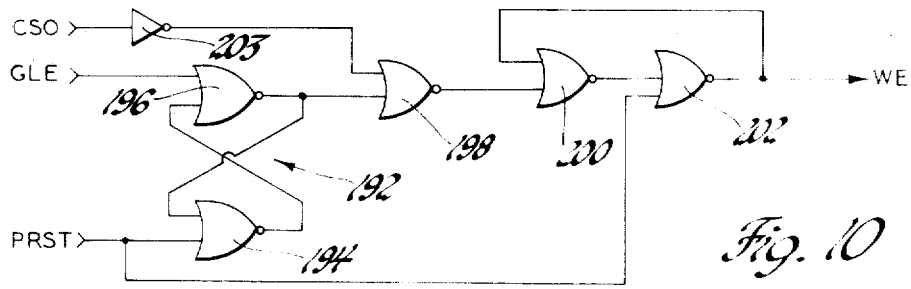
Fig. 10
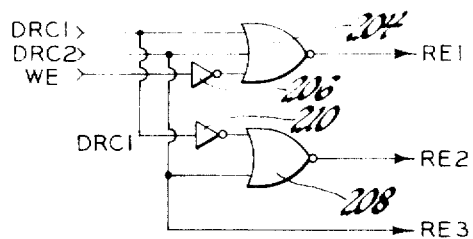
Fig. 11
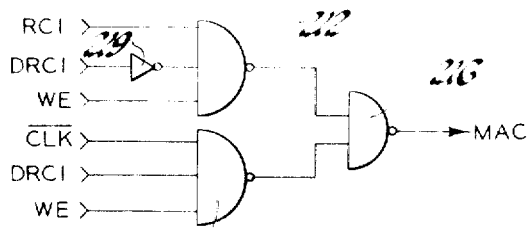
Fig. 12
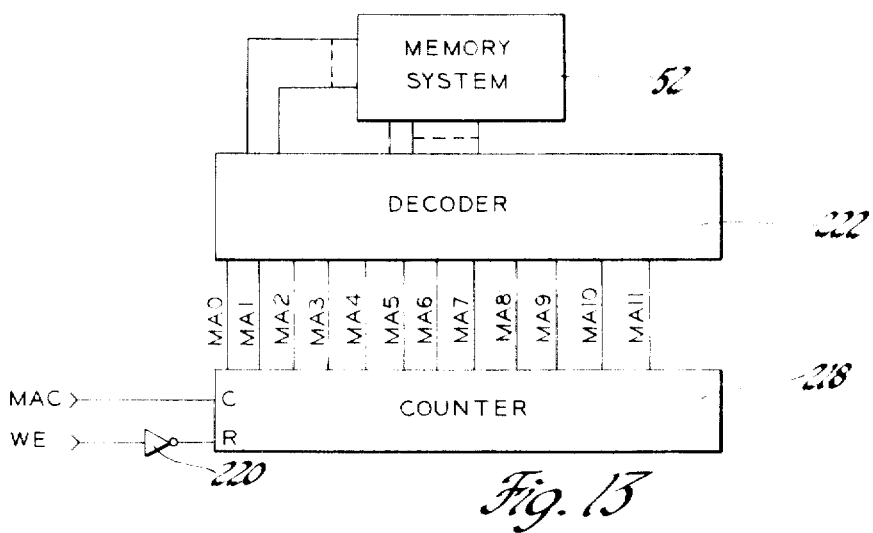
Fig. 13
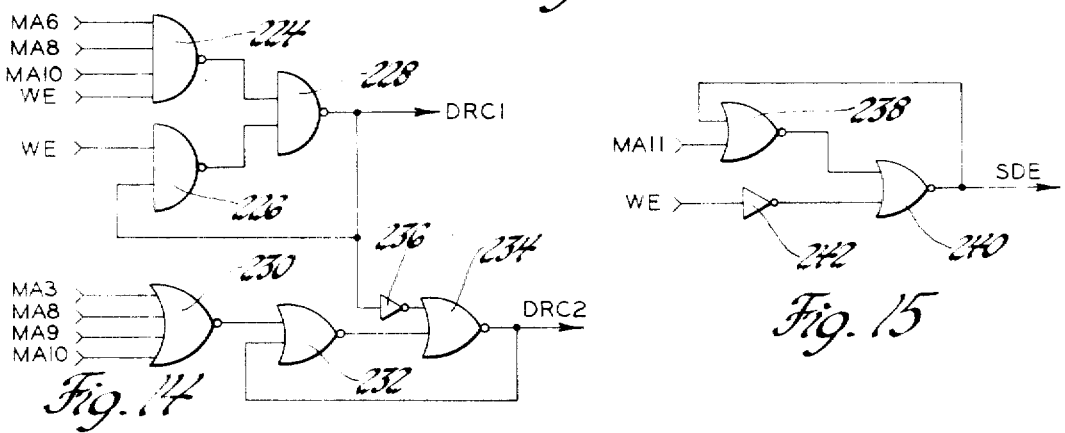
Fig. 14
Fig. 15

SOLID STATE CRASH RECORDER

This is a continuation-in-part of application Ser. No. 249,918, filed May 3, 1972, and assigned to the assignee of this invention.

This invention relates to a solid state crash recorder for memorizing pre and post crash conditions of a vehicle. Known crash recorders use systems whereby a recording medium is moved upon which information is recorded. In this manner, information existing prior to and during a crash, for example, may be memorized for subsequent review. It is the general object of this invention to provide for a vehicle crash recorder which does not utilize any moving parts.

It is another object of this invention to provide for an all solid state crash recorder for monitoring pre and post crash conditions of a vehicle.

The invention may be best understood by reference to the following description of a preferred embodiment and the drawings in which.

Figure 1:
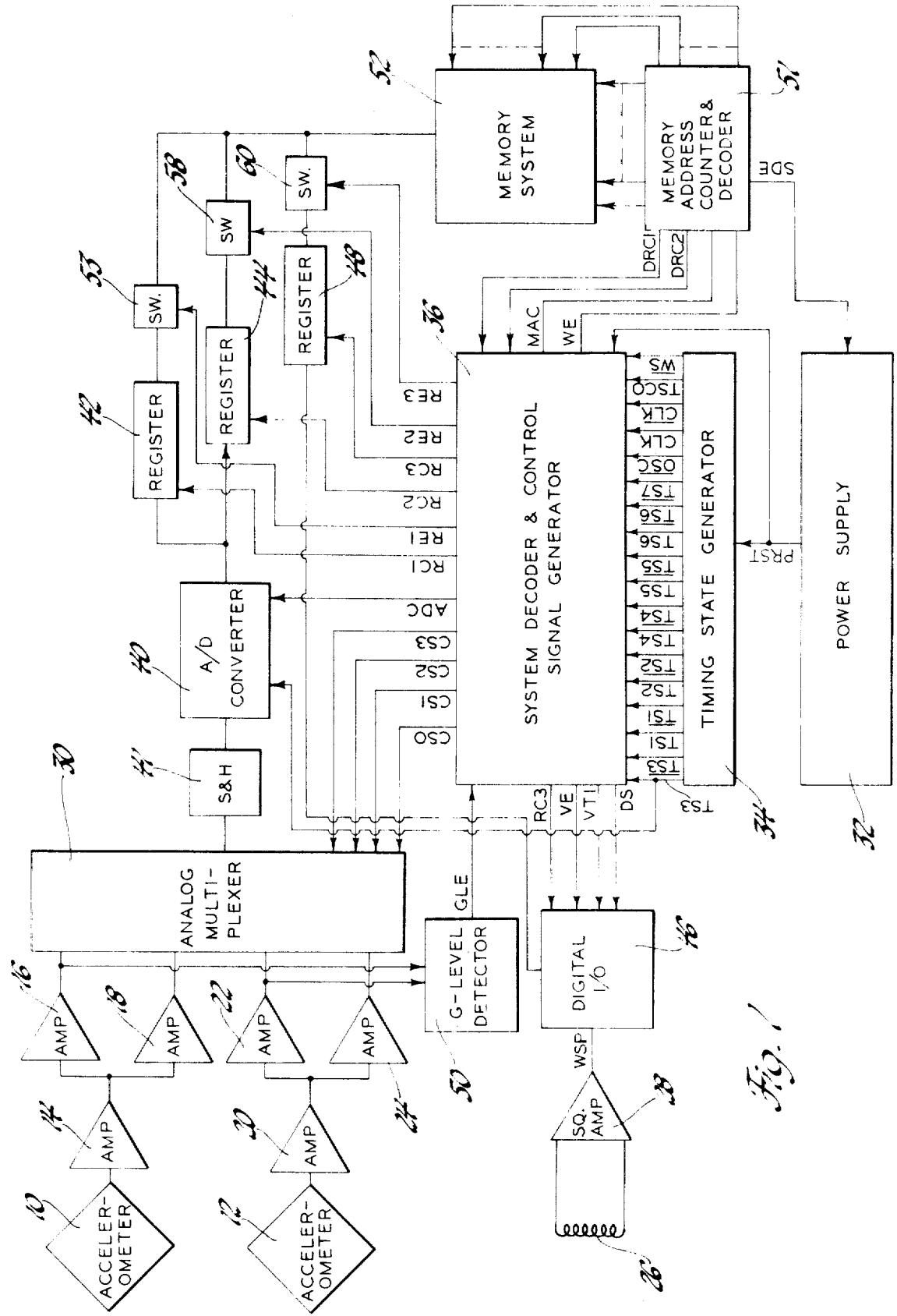
FIG. 1 is a block diagram of the preferred embodiment of the invention.
Figure 6:
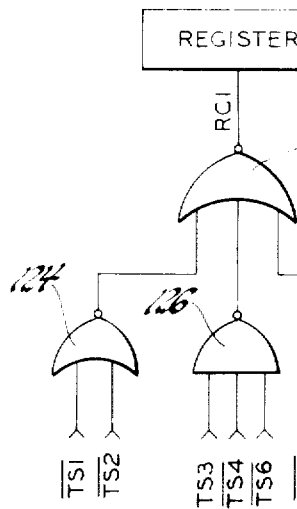
Figure 7:
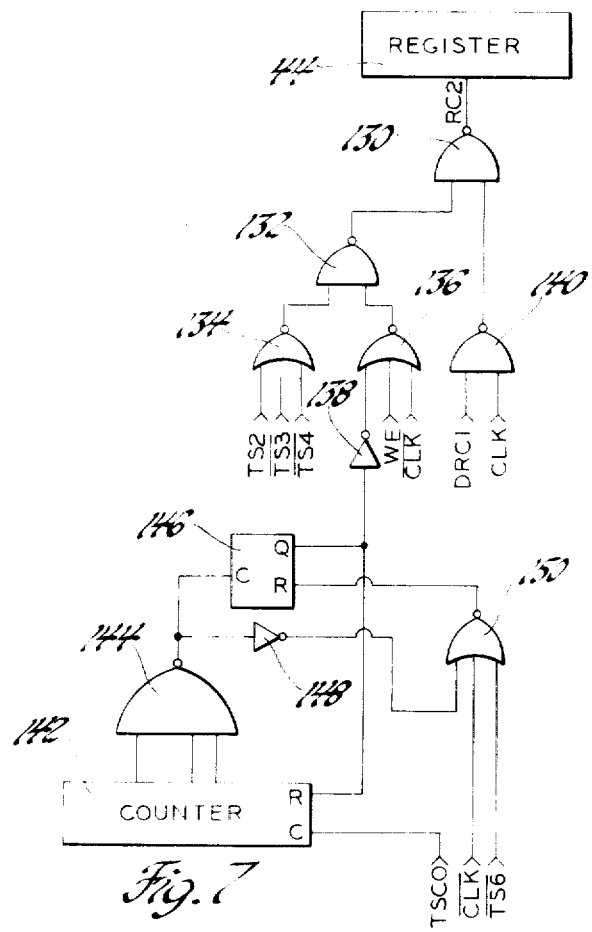
Figure 8:
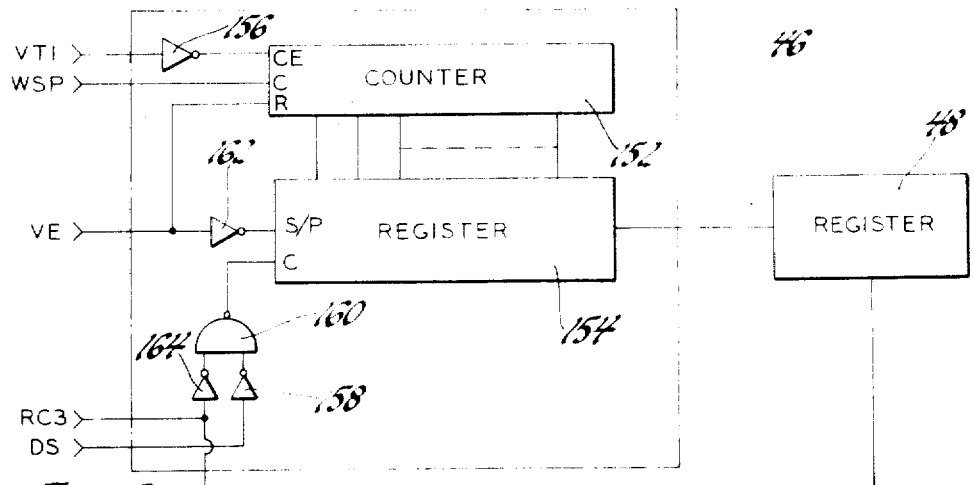
Figure 9:
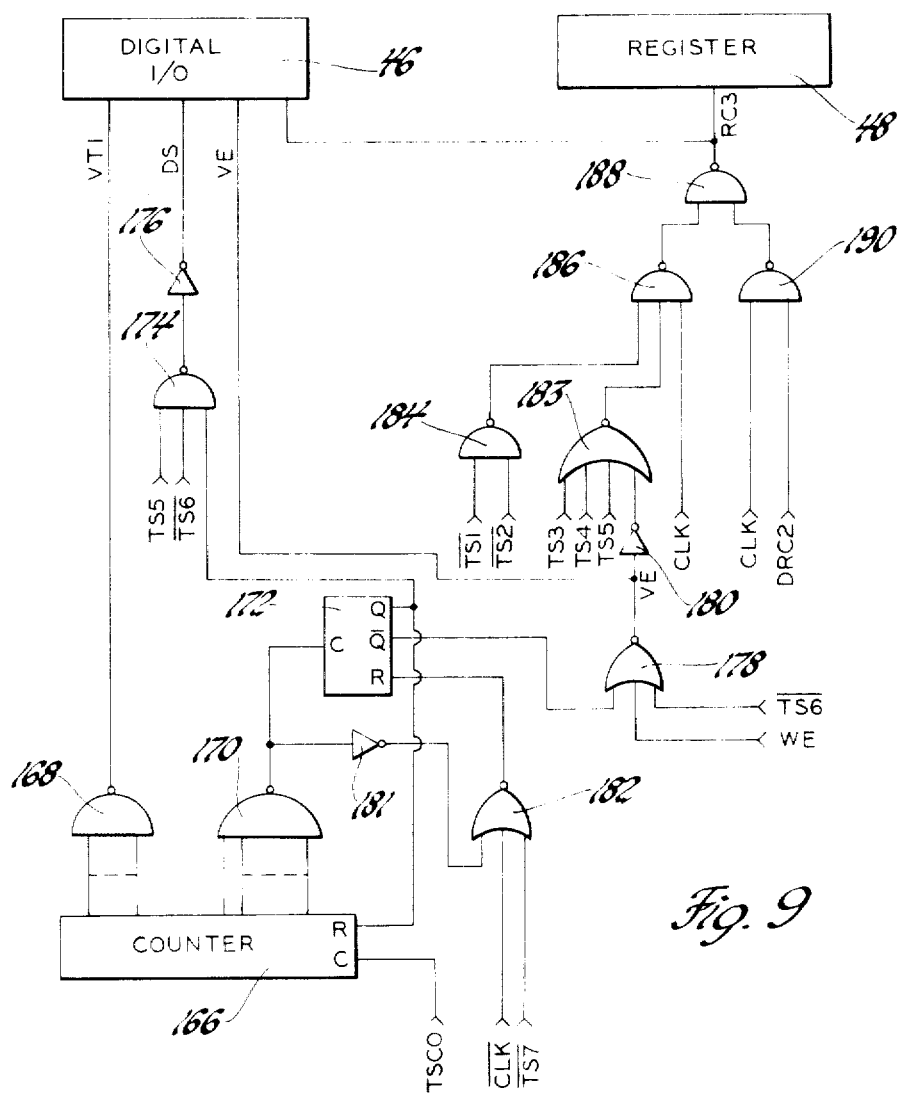

FIR. 5 is a logic diagram for generating the analog-to-digital clock pulses ADC;

FIG. 6 is a logic diagram for generating the register clock pulses RC1;

FIG. 7 is a logic diagram for generating the register clock pulses RC2;

FIG. 8 is a schematic of the digital input-output circuit of FIG. 1;

FIG. 9 is a logic diagram for generating the velocity time interval signal VTI, data shift signal DS, velocity enable signal VE and the register clock pulses RC3;

FIG. 10 is a logic diagram for generating the write enable signal WE;

FIG. 11 is a logic diagram for generating the read enable signals RE1, RE2 and RE3;

FIG. 12 is a logic diagram for generating the memory address clock pulses MAC;

FIG. 13 is a schematic diagram of the memory address counter and decoder of FIG. 1;

FIG. 14 is a logic diagram for generating the data record complete signals DRC1 and DRC2; and FIG. 15 is a logic diagram for generating the system destruct signal SDE.

Referring to FIG. 1, there is shown a solid state crash recorder for memorizing pre and post crash information relating to acceleration rates of the vehicle and for memorizing precrash information relating to the velocity of the vehicle. It will be obvious to one skilled in the art that although the preferred embodiment refers to memorizing acceleration and velocity, other types of information may be recorded.

Vehicle acceleration is monitored by an accelerometer 10 which is positioned in the vehicle so as to monitor acceleration along the longitudinal axis thereof and a similar accelerometer 12 which is positioned on the vehicle so as to monitor the acceleration thereof along its lateral axis. The output of the accelerometer 10, which is of the known variety whose output is analog in nature, is amplified by an amplifier 14 whose output is applied to the input of a low gain amplifier 16 and to the input of a high gain amplifier 18. The output of the accelerometer 12, which also is analog in nature, is amplified by an amplifier 20 whose output is coupled to the input of a low gain amplifier 22 and to the input of a high gain amplifier 24.

The outputs of the low gain amplifiers 16 and 22 provide useful information relating to high G forces as sensed by the accelerometers 10 and 12, respectively, and the high gain amplifiers 18 and 24 provide information useful with respect to low G forces as sensed by the accelerometers 10 and 12, respectively. The outputs of the amplifiers 16, 18, 22 and 24 are supplied to an analog multiplexer 30 which can be comprised of either solid state or electromechanical switches.

Vehicle velocity information is obtained through a vehicle wheel speed pickup coil 26 which is a portion of a conventional speed transducer whose output is an alternating signal having a frequency directly related to wheel speed and consequently vehicle speed. The output of the pickup coil 26 is applied to the input of a square wave amplifier 28 whose output is a square wave signal WSP having a frequency directly related to vehicle speed.

A power supply 32 supplies power to all the remaining portions of the crash recorder through power lines (not shown) and generates a power reset signal PRST which is supplied to a timing state generator 34 and a system decoder and control signal generator 36 to establish initial conditions therein each time the power supply 32 is energized.

The timing state generator 34 generates and supplies to the system decoder and control signal generator 36 a series of timing signals TS1, TS2, TS3, TS4, TS5, and TS6 and their inverse $\overline{TS1}$, $\overline{TS2}$, $\overline{TS3}$, $\overline{TS4}$, $\overline{TS5}$ and $\overline{TS6}$. The timing state generator 34 also generates a timing signal TS7, a strobe signal WS and an oscillator signal OSC and supplies their inverse $\overline{TS7}$, $\overline{WS}$ and $\overline{OSC}$ to the system decoder and control signal generator 36 along with a clock signal CLK, its inverse $\overline{CLK}$, and a timing state carryout signal TSCO. In addition, the timing signal TS3 is supplied to an analog-to-digital converter 40.

The system decoder and control signal generator 36 is responsive to the signals supplied thereto from the timing stage generator 34 to generate a plurality of channel select signals CS0, CS1, CS2 and CS3 which are sequentially supplied to the analog multiplexer 30 which is sequenced thereby to sequentially couple the outputs of the amplifiers 16, 18, 22 and 24, respectively, to a sample and hold circuit 41. The sample and hold circuit 41 is operative to hold the signal supplied thereto until the analog multiplexer 30 supplies another signal in response to one of the channel select signals CS0, CS1, CS2 or CS3, which signal is then held by the sample and hold circuit 41. The output of the sample and hold circuit 41 is supplied to the analog-to-digital converter 40 and consists of a sequence of signals representing the outputs of the amplifiers 16, 18, 22 and 24.

The system decoder and control signal generator 36 generates an analog-to-digital clock signal ADC comprised of a series of pulses which are supplied to the analog-to-digital converter 40 which is responsive thereto and to the timing signal TS3 to convert the output of the sample and hold circuit 41 to a digital indication of the magnitude thereof upon each occurrence of the timing signal TS3. This indication is a serial output comprised of a certain number of bits representing a digital word which in turn represents the magnitude of acceleration being sampled. The analog-to-digital converter 40 for performing the aforementioned function is well known in the art and will not be described in greater detail.

The output of the analog-to-digital converter 40 is coupled to a shift register 42 and a shift register 44. When clocking pulses are supplied to the shaft register 42 or 44 in synchronism with the bits in the serial output of the analog-to-digital converter 40, the bits are serially shifted into and through the respective register 42 or 44 and are retained thereby until shifted out of the last stage therein.

When the sample and hold circuit 41 has sampled the input thereto from the analog multiplexer 30 as determined by the system decoder and control signal generator 36, the system decoder and control signal generator 36 supplies the analog-to-digital clock signal ADC to the analog-to-digital converter 40 during the timing signal TS3. The analog-to-digital converter 40 is enabled thereby to supply the digital serial output representing the digital word corresponding to the magnitude of G level sampled by the sample and hold circuit 41 to the shift registers 42 and 44. Simultaneously therewith, the system decoder and control signal generator 36 supplies synchronized clocking pulses to either the shift register 42 or the shift register 44 into which the bits are shifted representing the G level sampled. If the input to the sample and hold circuit 41 from the analog multiplexer 30 were from the amplifier 16 or the amplifier 22 whose outputs provide useful information relating to high G levels of acceleration, the system decoder and control signal generator 36 generates and supplies register clock pulses RC1 in synchronism with the analog-to-digital clock signal ADC to the shift register 42 into which the serial output of the analog-to-digital converter 40 is shifted. Conversely, if the input to the sample and hold circuit 41 were from the amplifiers 18 or 24 which provide useful information relating to low G levels of acceleration, the system decoder and control signal generator 36 generates and supplies register clock pulses RC2 in synchronism with the analog-to-digital clock signal ADC to the shift register 44 into which the serial output of the analog-to-digital converter 40 is shifted. As it may not be desired to read the low G information into the register 44 as frequently as high G information is read into the shift register 42, the register clock pulses RC2 are not supplied to the shift register 44 each time the serial output of the analog-to-digital converter 40 represents low G information. Consequently, the period between the sets of register clock pulses RC2 is greater than the period between the sets of register clock pulses RC1.

As can be seen, as the system decoder and control signal generator 36 sequences the analog multiplexer 30, information relating to acceleration is periodically supplied to the shift registers 42 and 44 which store the information supplied thereto for a time period representing the most recent history of acceleration. The number of stages in the shift registers 42 and 44 are such that a plurality of words are contained therein at any given instant corresponding to the length of time of desired recent history that precrash information relating to high G and low G information, respectively, is to be stored.

From the foregoing description, it can be seen that digital words derived from the outputs of the amplifiers 16 and 22 are alternately read into the shift register 42 and that words derived from the outputs of the amplifiers 18 and 24 are alternately read into the shift register 44. Consequently, each of the shift registers 42 and 44 contain acceleration data from both of the accelerometers 10 and 12. It will be readily seen by one skilled in the art that a shift register could be provided for each of the amplifiers 16, 18, 22 and 24.

The output signal WSP of the square wave amplifier 28 is supplied to a digital input-output circuit 46 which also receives a velocity time interval signal VTI, a data shift signal DS, a velocity enable signal VE and register clock pulses RC3 which are generated by and supplied thereto from the system decoder and control signal generator 36. In response to the aforementioned signals, the digital input-output circuit 46 supplies a serial output comprised of a certain number of bits representing a digital word which in turn represents vehicle speed to a shift register 48, which is similar to the shift registers 42 and 44. The bits in the serial train supplied to the shift register 48 occur simultaneously with each pulse of the register clock pulses RC3. The register clock pulses RC3 are simultaneously supplied to the shift register 48 into which the serial output from the digital input-output circuit 46 is shifted. The vehicle velocity is periodically sampled in the foregoing manner. The shift register 48 contains a number of stages such that a number of words representing the desired length of time of most recent history of precrash information are contained therein.

In the absence of a vehicle crash, the aforementioned procedure is periodically repeated so that the contents of the shift registers 42, 44 and 48 are continually updated so as to represent the most recent history of acceleration and velocity.

The outputs of the amplifiers 16 and 22 are supplied to a G level detector 50. The G level detector 50 may take the form of any one of the well known threshold detectors which are responsive to an input signal of a predetermined magnitude or to an input signal of a certain magnitude for a specified period of time for generating an output signal. In the event that the G level detector 50 senses an output from either of the amplifiers 16 or 22 having a magnitude representing a vehicle crash, a G level enable signal GLE is generated thereby and supplied to the system decoder and control signal generator 36. Upon receipt of the G level enable signal GLE, the system decoder and control signal generator 36 generates a write enable signal WE when the output of the amplifier 16 is first sampled after the detection of a crash. The write enable signal WE is effective to prevent further inputs from being memorized by the shift registers 44 and 48 by inhibiting the generation of further register clock pulses RC2 and RC3 and which initiates the post-crash procedure. In this manner, the precrash information contained within the shift registers 44 and 48 is retained. The system decoder and control signal generator 36 continues to sequence the analog multiplexer 30 in the manner previously described. When the write enable signal WE is generated, the system decoder and control signal generator 36 and a memory address counter and decoder 51 cooperate to supply the information to a memory system 52.

Upon the generation of the write enable signal WE, the system decoder and control signal generator 36 generates a read enable signal RE1 which is supplied to a switch 53 which is closed thereby to couple the output of the last stage of the shift register 42 to the memory system 52. The contents of the shift register 42 are supplied in serial form to the memory system 52 as additional information is read into said shift register 42 from the analog-to-digital converter 40. Simultaneously with the serial input to the memory system 52, the system decoder and control signal generator 36 supplies memory address clock pulses MAC to the memory address counter and decoder 51 synchronized with the serial input to the memory system 52. The memory address counter and recorder 51 is responsive to the memory address clock pulses MAC to select the address in the memory system 52 at which each bit input thereto is memorized The serial output first supplied from the shift register 42 and which passes through the switch 53 represents the information stored within the shift register 42 at the time of the crash as detected by the G level detector 50 and consequently represents the precrash acceleration levels from the outputs of the amplifiers 16 and 22. Information is continually read into and out of the shift register 42 until all of the precrash information contained therein is memorized in the memory system 52 and a predetermined period of post-crash information is read therefrom and memorized in the memory system 52.

After the memory system 52 has stored the predetermined number of bits from the output of the register 42, as determined by a predetermined number of memory address clock pulses MAC supplied to the memory address counter and decoder 51, the memory address counter and decoder 51 supplies a data record complete signal DRC1 to the system decoder and control signal generator 36 to effect the disabling of the switch 53 to prevent additional information from being supplied to the memory system 52 from the shift register 42.

The system decoder and control signal generator 36 is responsive to the data record complete signal DRC1 for generating and supplying a read enable signal RE2 to a switch 58 which couples the output of the last stage in the shift register 44 to the memory system 52. Also simultaneously therewith, the system decoder and control signal generator again supplies the register clock pulses RC2 to the shift register 44 at a frequency equal to the frequency of the clock signal CLK so as to read the contents therein into the memory system 52 in the same manner as the shift register 42. Again, the system decoder and control signal generator 36 supplies the memory address clock pulses MAC at the frequency of the clock signal CLK and synchronized with the register clock pulses RC2 to the memory address counter and decoder 51 which addresses the memory system 52.

After the contents of the shift register 44 have been read into the memory system 52, as determined by a predetermined number of memory address clock pulses MAC supplied to the memory address counter and decoder circuit 51, the memory address counter and decoder circuit 51 supplies a data record complete signal DRC2 to the system decoder and control signal generator 36 which is responsive thereto to disable the switch 58 and to generate a read enable signal RE3. The read enable signal RE3 is supplied to a switch 60 which is enabled thereby to couple the output of the last stage of the shift register 48 to the memory system 52. Simultaneously, the system decoder and control signal generator 36 supplies the register clock signal RC3 to the shift register 48 at the same frequency as the clock signal CLK and the memory address clock signal MAC at the same frequency to the memory address counter and the decoder 51 to read the contents of the shift register 48 into the memory system 52 in the same manner as the shift registers 42 and 44. When the contents of the shift register 48 have been read into the memory system 52, as determined by a predetermined number of memory address clock pulses MAC supplied to the memory address clock counter and decoder 51, the memory address counter and decoder 51 supplies a shutdown enable signal SDE to the power supply 32 which is disabled thereby to prevent any further information from being monitored by the solid state crash recorder.

Figure 2:
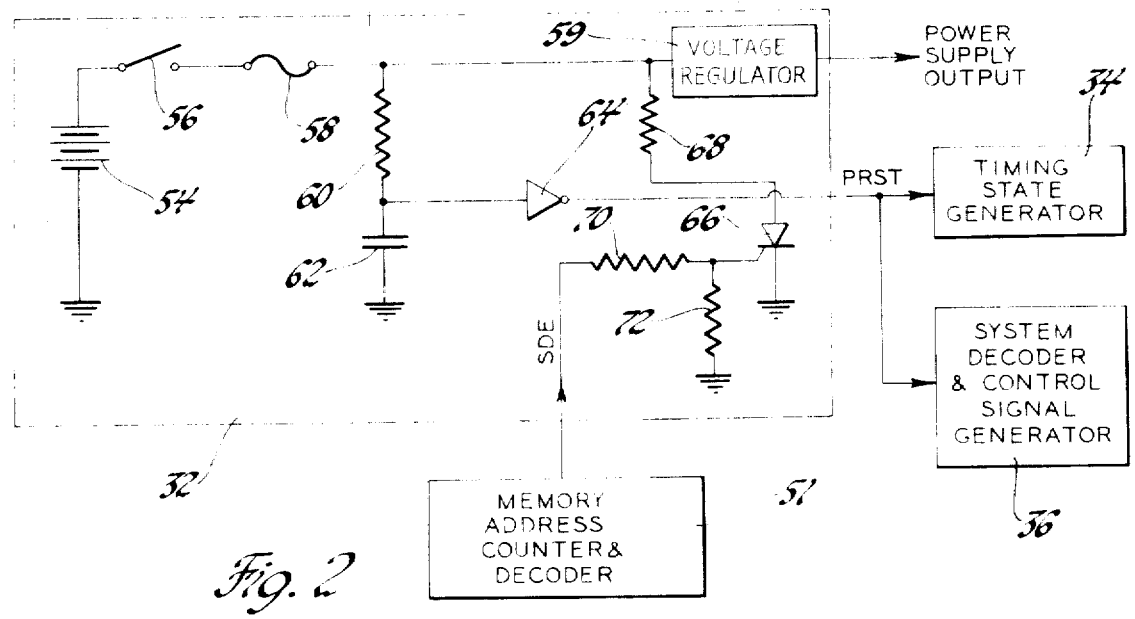
FIG. 2 is a schematic of the power supply of FIG. 1.

Referring to FIG. 2, the power supply 32 is comprised of a DC voltage source 54 which may be, for example, the vehicle battery whose output is coupled to the remaining portions of the solid state crash recorder through a vehicle ignition switch 56, a fuse 58 and a conventional voltage regulator 59. The power supply 32 generates the power reset signal PRST by means of a timing circuit including a resistor 60 series connected with a capacitor 62, the series circuit being coupled in parallel with the DC voltage source 54, the vehicle ignition switch 56 and the fuse 58. The junction between the resistor 60 and the capacitor 62 is coupled to an inverter 64.

Upon the energization of the power supply 32 by the closure of the vehicle ignition switch 56, the input to the inverter 64 is at ground potential. Consequently, its output is a positive voltage level. When the capacitor 62 has charged to the switching level of the inverter 64, the output thereof switches to ground potential. This positive voltage pulse constitutes the power reset signal PRST which is coupled to the timing state generator 34 and the system decoder and control signal generator 36 to establish initial conditions therein each time the power supply 32 is energized by the closure of the vehicle ignition switch 56.

As previously indicated with reference to FIG. 1, after the detection of a vehicle crash and the memory system 52 has memorized the desired information relating to acceleration and vehicle velocity, the shutdown enable signal SDE is supplied by the memory address counter and decoder 51 to the power supply 32 which is disabled thereby. This is accomplished by means of an SCR 66 which is series coupled with a small resistor 68 with the fuse 58, the vehicle ignition switch 56 and the DC voltage source 54. The shutdown enable signal SDE is coupled across a voltage divider comprised of a resistor 70 and a resistor 72, the output thereof being coupled to the control electrode of the SCR 66. When the shutdown enable signal SDE is generated, the SCR 66 is gated on to short the battery to ground through the fuse 58. The current through the fuse 58 is sufficient to cause it to open the circuit from the DC voltage source 54. Consequently, the solid state crash recorder is thereafter disabled.

Figure 3:
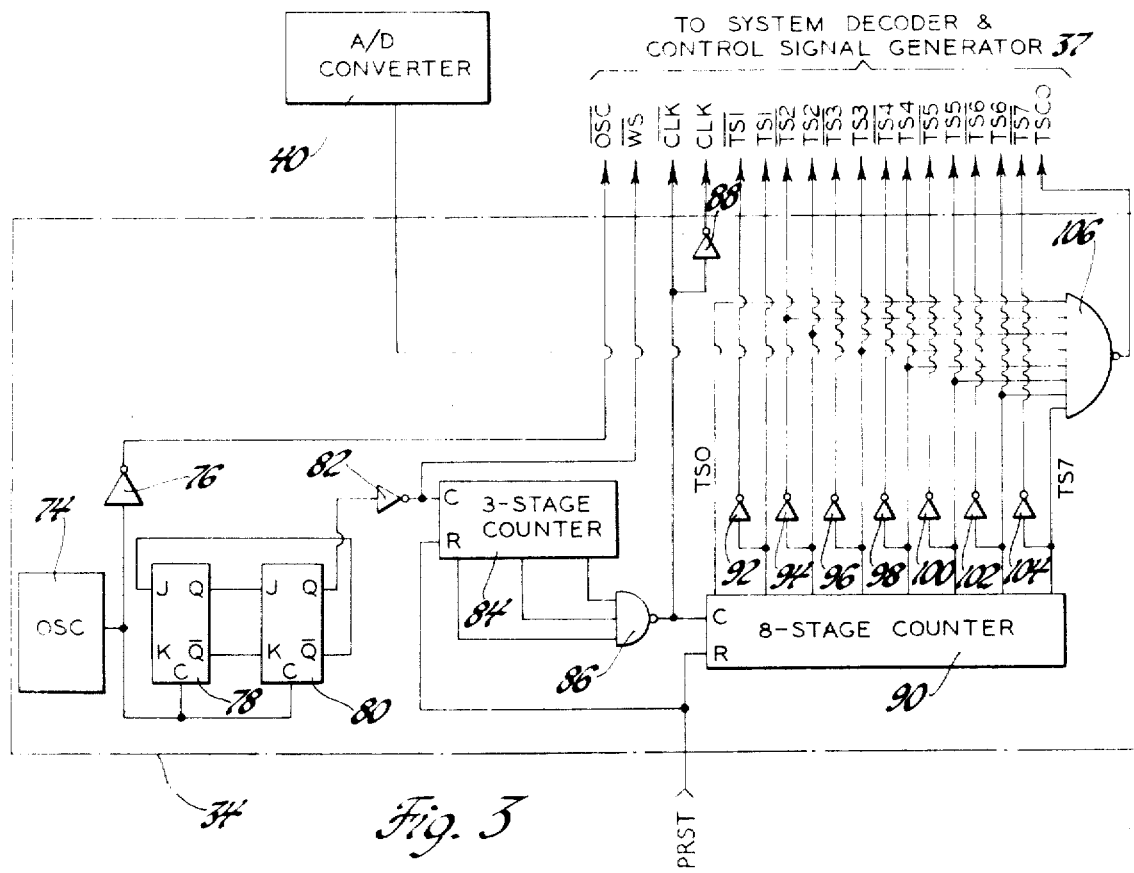
FIG. 3 is a schematic of the timing state generator of FIG. 1.

Referring to FIG. 3, the timing state generator 34 is comprised of an oscillator 74 which generates the oscillator signal OSC which is coupled to the input of an inverter 76 and to the respective clock inputs of a pair of JK flip-flops 78 and 80. The output of the inverter 76 is the inverse oscillator signal $\overline{OSC}$ which is supplied to the system decoder and control signal generator 36. The $\overline{Q}$ output of the flip-flop 78 is coupled to the K input of the flip-flop 80 and its Q output is coupled to the J input of the flip-flop 80. The $\overline{Q}$ output of the flip-flop 80 is coupled to the J input of the flip-flop 78 and the Q output thereof, which constitutes the strobe signal WS, is coupled to the input of an inverter 82. The output of the inverter 82 is the inverse strobe signal $\overline{WS}$ which is supplied to the system decoder and control signal generator and is coupled to the clock input of a three-stage counter 84, the outputs of each stage of which are coupled to respective inputs of a NAND gate 86. The output of the NAND gate 86 constitutes the inverse clock signal $\overline{CLK}$ which is coupled to the input of an inverter 88 and to the clock input of an eight-stage counter 90. The output of the inverter 88 constitutes the clock signal CLK which, with the inverse clock signal $\overline{CLK}$, is supplied to the system decoder and control signal generator 36.

The output of the first stage of the eight-stage counter 90 constitutes a timing signal TS0 and the outputs of the remaining stages of the eight-stage counter constitutes the timing signals TS1 through TS7, respectively. The timing signals TS1 through TS7 are coupled to respective inverters 92, 94, 96, 98, 100, 102 and 104 whose outputs constitute the inverse timing signals $\overline{TS1}$ through $\overline{TS7}$. The timing signals TS0 through TS7 are coupled to respective inputs of a NAND gate 106. The output of the NAND gate 106 constitutes the timing stage carry-out signal TSC0 which occurs once for each cycle of the eight-stage counter 90. The timing state signals TS1 thorugh TS6 and their inverse along with the inverse of the timing signal TS7 are supplied to the system decoder and control signal generator 36.

The power reset signal PRST from the power supply 32 is coupled to the reset inputs of the counter 84 and the counter 90, which are reset each time the ignition switch 56 in FIG. 2 is closed so as to establish initial conditions within the timing stage generator 34 each time the power supply 32 is energized.

Figure 4:
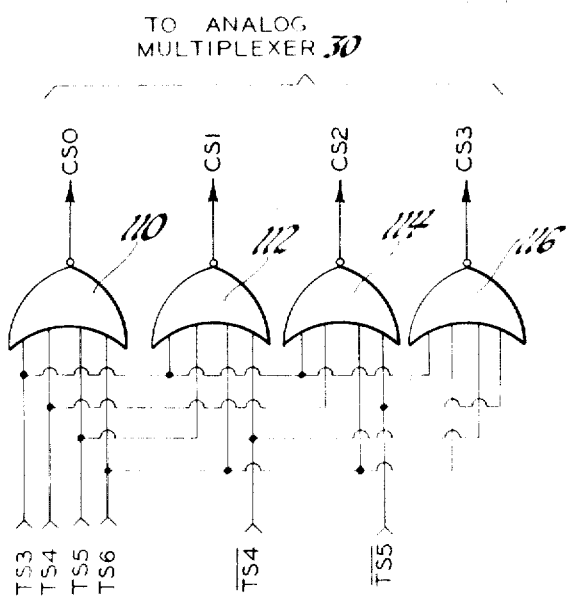
FIG. 4 is a logic diagram for generating the channel select signals SC0, CS1, CS2 and CS4.

Referring to FIG. 4, the system decoder and control signal generator 36 generates the channel select signals CS0, CS1, CS2 and CS3 for sequencing the analog multiplexer 30 by means of respective NOR gates 110, 112, 114 and 116. The NOR gate 110 receives at respective inputs the timing stage signals TS3, TS4, TS5 and TS6 from the timing state generator 34 and supplies the channel select signal CS0 at its output. The NOR gate 112 receives at respective inputs the timing state signals TS3, TS5, TS6 and the inverse timing signal $\overline{TS4}$ and supplies at its output the channel select signal SC1. The NOR gate 114 receives at respective inputs thereof the timing signals TS3, TS4, TS6 and the inverse timing signal $\overline{TS5}$ and supplies at its output the channel select signal CS2. The NOR gate 116 receives at respective inputs the timing signals TS3, TS6, the inverse timing signals $\overline{TS4}$ and $\overline{TS5}$ and supplies at its output the channel select signal CS3. As indicated with reference to FIG. 1, the channel select signals CS0 through CS3 are effective to sequentially couple the outputs of the respective amplifiers 16, 18, 22 and 24 through the analog multiplexer 30 to the input of the sample and hold circuit 41.

Figure 5:
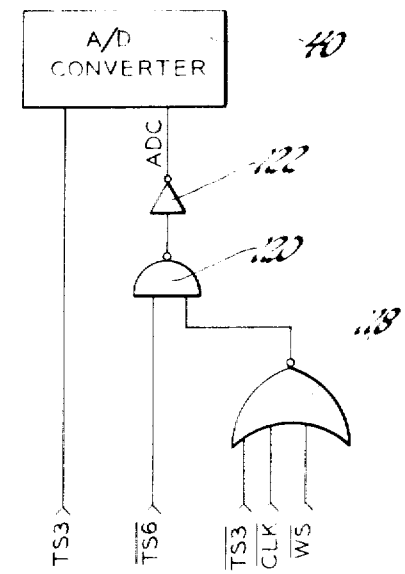

Referring to FIG. 5, the system decoder and control signal generator 36 generates the analog-to-digital clock signal ADC by means of a NOR gate 118, a NAND gate 120 and an inverter 122. The NOR gate 118 receives at its respective inputs the inverse timing signal $\overline{TS3}$, the inverse clock signal $\overline{CLK}$ and the inverse strobe signal $\overline{WS}$ and supplies its output to one input of the NAND gate 120 which receives the inverse timing signal $\overline{TS6}$ at a second input thereof. The output of the NAND gate 120 is supplied to the inverter 122 whose output constitutes the analog-to-digital clock signal ADC.

As indicated with reference to FIG. 1, the analog-to-digital clock signal ADC and the timing signal TS3 are supplied to the analog-to-digital converter 40 which is responsive thereto to convert the output of the sample and hold circuit 41 to a digital indication in serial form of the magnitude thereof upon each occurrence of the timing signal TS3. This signal is coupled to the input of the shift register 42 and the shift register 44.

Referring to FIG. 6, the system decoder and control signal generator 36 generates the register clock pulses RC1 in synchronism with the analog-to-digital clock signal ADC so as to shift information into the shift register 42 by means of a NOR gate 124, a NAND gate 126, and a NOR gate 128. The NOR gate 124 receives at its respective inputs the inverse timing signals $\overline{TS1}$ and $\overline{TS2}$ and supplies its output to an input of the NOR GATE 128. The NAND gate 126 receives at its respective inputs the timing signal TS3 and the inverse timing signals $\overline{TS4}$ and $\overline{TS6}$ and supplies its output to another input of the NOR gate 128. The NOR gate 128 also receives at a third input, the inverse clock signal $\overline{CLK}$. The output of the NOR gate 128 constitutes the register clock pulses RC1 which are in synchronism with the analog-to-digital clock signal ADC when the output of the analog-to-digital converter 40 represents information supplied to the sample and hold circuit 41 by the amplifiers 16 or 22. The register clock pulses RC1 are continually supplied to the shift register 42 of FIG. 1 even in the event of a crash so that post-crash information relating to acceleration is continually shifted into the shift register 42 until the desired quantity of post-crash information is memorized by the memory system 52 as previously described with reference to FIG. 1.

Referring to FIG. 7, the system decoder and control signal generator 36 generates the register clock pulses RC2 when the output of the analog-to-digital converter 40 represents information supplied to the sample and hold circuit 41 from either the amplifier 18 or the amplifier 24 by means of a NAND gate 130, a NAND gate 132, a NOR gate 134 and a NOR gate 136. The NOR gate 134 has supplied to respective inputs thereof the timing signal TS2 and the inverse timing signals $\overline{TS3}$ and $\overline{TS4}$. The output of the NOR gate 134 is coupled to an input of the NAND gate 132. The NOR gate 136 has supplied to respective inputs thereof the inverse clock signal $\overline{CLK}$, the write enable signal WE and the output of an inverter 138. The output of the NOR gate 136 is supplied to a second input of the NAND gate 132 whose output is supplied to one input of the NAND gate 130. The NAND gate 130 also receives an input from the output of a NAND gate 140 which has applied to respective inputs thereof the data record complete signal DRC1 and the clock signal CLK.

Prior to a vehicle crash, the data record complete signal DRC1 is a ground signal resulting in the output of the NAND gate 140 being at a positive voltage level. The output of the NAND gate 130 constitutes the periodically occurring set of register clock pulses RC2 having a period determined by the output of the inverter 138. This period is greater than the period between the register clock pulses RC1 as it is not desired to read the low G information into the shift register 44 as frequently as the high G information is read into the shift register 42.

The period at which the register clock pulses RC2 are supplied to the shift register 44 is measured by a predetermined number of timing state carry-out signals TSC0 from the timing stage generator 34 of FIG. 3. This is accomplished by a counter 142 having the timing carry-out signal TSC0 applied to the clock input thereof. A NAND gate 144 monitors the stages within the counter 142 whose outputs, when occurring simultaneously, represent the predetermined number of timing state carry-out signals. When the outputs of those stages are all at a positive voltage level, the NAND gate 144 supplies a ground signal to clock a flip-flop 146 whose Q output is coupled to the input of the inverter 138. When the flip-flop 146 is clocked, the Q output shifts from a positive voltage level to ground level to cause the output of the inverter 138 to shift from ground level to a positive voltage level to enable the register clock pulses RC2 to be generated and supplied to the shift register 44. The output of the NAND gate 144 is also applied to the input of an inverter 148 whose output is applied to one input of a NOR gate 150. The NOR gate 150 also receives at respective inputs thereof the inverse clock signal $\overline{CLK}$ and the inverse timing state signal $\overline{TS6}$. The output of the NOR gate 150 is applied to the reset input of the flip-flop 146. The inverse timing signal $\overline{TS6}$ is at ground level when the flip-flop 146 is clocked by the output of the NAND gate 144. During this time period, the register clock pulses RC2 are supplied to the shift register 44. When the inverse timing signal $\overline{TS6}$ shifts to a positive voltage level, the output of the NOR gate 150 shifts to ground level and resets the flip-flop 146. Simultaneously therewith, the Q output of the flip-flop 146, which is supplied to the reset input of the counter 142, resets the counter 142 and prevents the generation of further register clock pulses by the NOR gates 134 and 136 and the NAND gate 132 until the flip-flop 146 is again clocked.

Upon the event of a vehicle crash, the write enable signal WE, which is supplied to the NOR gate 136, shifts from ground level to a positive voltage level so as to maintain the output of the NAND gate 132 at a positive voltage level which is effective to prevent the generation of the register clock pulses RC2 until such time that the precrash information and the predetermined period of post-crash information supplied by the shift register 42 is memorized by the memory system 52. As indicated with reference to FIG. 1, the memory address counter and decoder 51 then generates the data record complete signal DRC1 which in conjunction with the clock signal CLK applied to the respective inputs of the NAND gate 140 again generates the register clock pulses RC2 at the frequency equal to the frequency of the clock signal CLK to shift the contents of the shift register 44 through the switch 58 into the memory system 52 to be memorized thereby.

Referring to FIG. 8, the digital input output circuit 46 is comprised of a counter 152 having a plurality of stages, the outputs of each being supplied in parallel form to a parallel input-serial output register 154. The counter 152 is of a known variety which counts pulses supplied to its clock input when the input to its count enable input is at ground potential and which is reset when the input to its reset terminal is at a positive voltage level. The register 154 is of the known variety in which a pulse applied to its clock input is effective to transfer data in parallel form into the register when the input to its serial/parallel control input is at a positive voltage level and is effective for shifting the contents of the register 154 in serial form to an output thereon when the input to the serial/parallel control input is at ground potential.

The wheel speed pulses WSP supplied by the square wave amplifier 28 in FIG. 1 are applied to the clock input of the counter 152. The system decoder and control signal generator supplies the velocity time interval signal VTI to the input of an inverter 156 whose output enables the counter 152 during the time period of the velocity time interval signal VTI. During the period of the velocity time interval signal VTI, the counter 152 counts wheel speed pulses WSP. At the trailing edge of the velocity time interval signal VTI, the counter 152 is disabled with the contents therein being a binary number representing vehicle velocity. The system decoder and control signal generator 36 then supplies the data shift signal DS to the input of an inverter 158 whose output shifts from a positive voltage level to ground potential which is applied to an input of a NAND gate 160. The NAND gate 160 has its output coupled to the clock input of the register 154 and is responsive to the output of the inverter 158 upon the occurrence of the data shift signal DS to supply a positive voltage pulse to the clock input. At this time, the velocity enable signal VE is at ground potential and is applied to the input of an inverter 162 whose output is coupled to the serial/parallel control input of the register 154. Consequently, the output of the NAND gate 160 is effective for transferring the contents of the counter 152 in parallel form into the register 154. Upon the trailing edge of the data shift signal DS, the system decoder and control signal generator 36 supplies the velocity enable signal VE to the input of the inverter 162 and to the reset input of the counter 152. The counter 152 is reset thereby and the register 152 is placed in its serial operation mode. Thereafter, the system decoder and control signal generator 36 supplies the register clock pulses RC3 to the input of an inverter 164 whose output enables the NAND gate 160 to clock the register 154 and shift the contents therein to the shift register 48 in serial form. As the register clock pulses RC3 are simultaneously applied to the shift register 48, the contents of the register 154 are shifted into the shift register 48 in the manner described with reference to FIG. 1. The aforementioned cycle is periodically repeated so as to continually update the contents of the shift register 48 to provide the most recent history of vehicle velocity.

Referring to FIG. 9, there is shown the circuit within the system decoder and control signal generator 36 for generating the velocity time interval signal VTI, the data shift signal DS, the velocity enable signal VE and the register clock pulses RC3. The time period between the sampling of the vehicle velocity is determined by a predetermined number of timing state carry-out signals TSC0 in the same manner as in the generation of the register clock pulses RC2 in FIG. 7. The timing state carry-out signal TSC0 is supplied to the clock input of a counter 166 which accumulates the number of timing state carry-out signals TSC0 supply thereto. A logic circuit including a NAND gate 168 monitors selected stages within the counter 166 and supplies the velocity time interval signal when the selected stages are in a predetermined state. Although the logic circuit is shown only to include the NAND gate 168, a plurality of logic elements may be necessary in order to obtain a velocity time interval signal VTI of the proper duration. A NAND gate 170 also monitors selected stages within the counter 166 and supplies a signal to the clock input of a flip-flop 172 when an additional number of timing state carry-out signals is received at the clock input of the counter 166. The flip-flop 172 is responsive thereto to shift its Q output from a ground potential to a positive voltage level and to shift its $\overline{Q}$ output from a positive voltage to ground potential. The Q output is supplied to one input of a NAND gate 174 which also receives at respective inputs the timing state signal TS5 and the inverse timing state signal $\overline{TS6}$. The output of the NAND gate 174 is supplied to an inverter 176 whose output constitutes the data shift signal DS which is supplied to the digital input-output circuit 46. The output of the inverter 176 is caused to shift from ground potential to a positive voltage level at a predetermined time after the velocity time interval pulse VTI.

A NOR gate 178 receives at its respective inputs the $\overline{Q}$ output of the flip-flop 172, the write enable signal WE and the inverse timing signal $\overline{TS6}$. As the write enable signal is at ground potential prior to the occurrence of a vehicle crash, the NOR gate 178 is enabled when the inverse timing signal $\overline{TS6}$ shifts to ground potential after the flip-flop has been clocked to generate the velocity enable signal VE which is supplied to the digital input-output circuit 46 and to an inverter 180. Simultaneously, the data shift signal DS shifts to ground potential as a result of the inverse timing signal $\overline{TS6}$ supplied to the NAND gate 174. The output of the NAND gate 170 is also applied to the input of an inverter 181 whose output is applied to one input of a NOR gate 182. The NOR gate 182 also receives at respective inputs thereof the inverse clock signal $\overline{CLK}$ and the inverse timing signal $\overline{TS7}$. The output of the NOR gate 182 is applied to the reset input of the flip-flop 172. The inverse timing signal $\overline{TS7}$ is at ground level when the flip-flop 172 is clocked by the output of the NAND gate 170. During the remaining time period that the inverse timing signal $\overline{TS7}$ is at ground level, the velocity enable signal VE is generated. When the inverse timing signal $\overline{TS7}$ shifts to a positive voltage level, the output of the NOR gate 182 resets the flip-flop 172 to terminate the velocity enable signal VE. Simultaneously therewith, the Q output of the flip-flop 172, which is supplied to the reset input of the counter 166, resets the counter 166. The velocity enable signal VE is periodically repeated in the foregoing manner. The velocity enable signal VE enables a circuit including a NOR gate 183, a NAND gate 184, a NAND gate 186 and a NAND gate 188 to supply the register clock pulses RC3 to the digital input-output circuit 46 and to the shift register 48 to shift the data from the digital input-output circuit 46 into the shift register 48 in the manner described with reference to FIG. 1. The NAND gate 184 receives at its respective inputs the inverse timing signals $\overline{TS1}$ and $\overline{TS2}$ and supplies its output to an input of the NAND gate 186. The NOR gate 183 receives at its respective inputs the timing state signals TS3, TS4 and TS5 in addition to the output of the inverter 180 and supplies its output to a second input of the NAND gate 186. In addition, the NAND gate 186 receives the clock signal CLK at a third input thereof, the output of the NAND gate 186 being supplied to an input of the NAND gate 188. As mentioned previously, these gates are enabled during periods determined by the velocity enable signal VE to generate the register clock pulses RC3. Upon the occurrence of a vehicle crash, the write enable signal WE shifts from ground potential to a positive level to disable the NOR gate 178 so as to prevent a velocity enable signal VE from being generated. In this manner, further vehicle velocity information is prevented from being supplied to the shift register 48 upon the occcurence of a crash. In addition, the write enable signal WE, upon the occurrence of a vehicle crash, is effective for preventing the generation of the register clock signals RC3 by means of the NAND gates 184 and 186 and the NOR gate 183 by maintaining the output of the NAND gate 186 at a positive voltage level until the register clock pulses RC3 are again generated by means of a NAND gate 190 after the occurrence of a crash when the memory address counter and decoder 51 generates the data record complete signal DRC2 representing that the contents of the shift register 44 have been memorized by the memory system 52. The data record complete signal DRC2 is supplied to an input of the NAND gate 190 which also receives at a second input thereof the clock signal CLK. The output of the NAND gate 190 is supplied to a second input of the NAND gate 188. The data record complete signal DRC2 and the clock signal CLK are effective for generating the register clock pulses RC3 at a frequency equal to the frequency of the clock signal CLK. In this manner, the contents of the register 48 are shifted into the memory system 52.

Upon the occurrence of a vehicle crash and the generation of the G level enable signal GLE by the G level detector 50, the system decoder and control signal generator 36 generates the write enable signal WE as shown in FIG. 10. As shown therein, a flip-flop 192 is comprised of a NOR gate 194 and a NOR gate 196, their outputs being coupled to respective inputs of one another with the output of the NOR gate 196 constituting the output of the flip-flop 192. The NOR gate 194 receives at a second input thereof the power reset signal PRST and the NOR gate 196 receives at a second input thereof the G level enable signal GLE. The output of the NOR gate 196 is supplied to an input of a NOR gate 198 whose output is coupled to an input of a NOR gate 200. The output of the NOR gate 200 is coupled to the input of a NOR gate 202 whose output is fed back to a second input of the NOR gate 200 so as to provide a latch function. An inverter 203 receives the channel select signal CS0 at its input and supplies its inverse to a second input of the NOR gate 198. The output of the NOR gate 202 constitutes the write enable signal WE which is generated as follows: When the power reset signal PRST is generated upon the energization of the power supply 32, the output of the NOR gate 196 is set to a positive voltage level and the output of the NOR gate 202 is set to ground potential. Consequently, the output of the NOR gate 198 is at ground potential and the output of the NOR gate 200 is at a positive voltage level. Upon the occurrence of a vehicle crash and the generation of the G level enable signal GLE by the G level detector 50, the flip-flop 192 is shifted to supply a ground signal to the NOR gate 198.

Upon the first occurrence of the channel select signal CS0 corresponding to the sampling of the output of the amplifier 16, the output of the inverter 203 shifts to ground potential to cause the NOR gate 198 to supply a positive voltage to the NOR gate 200. As the feedback to the second input of the NOR gate 200 is ground potential, the output thereof shifts to a positive voltage level to cause the NOR gate 202 to shift to a positive voltage level and be maintained at said level due to the feedback to the NOR gate 200. This positive voltage level constitutes the write enable signal WE.

As previously indicated, the write enable signal WE prevents further information from being shifted into the shift registers 44 and 48.

Referring to FIG. 11, the read enable signal RE1 is generated by a NOR gate 204. The write enable signal WE is supplied to the input of an inverter 206 whose output is supplied to one input of the NOR gate 204. The data record complete signals DRC1 and DRC2 are also supplied to respective inputs of the NOR gate 204. Upon the generation of the write enable signal WE, the NOR gate 204 supplies the read enable signal RE1 to the switch 53 of FIG. 1 which is energized to couple the serial output of the shift register 42 to the memory system 52. When the pre and post crash information from the shift register 42 is memorized by the memory system 52, the data record complete signal DRC1 disables the NOR gate 204 to deenergize the switch 53.

The read enable signal RE2 is generated by a NOR gate 208 which receives the data record complete signal DRC2 at an input thereof and receives the output of an inverter 210 at a second input. The data record signal DRC1 is applied to the input of the inverter 210. Upon the generation of the data record signal DRC1, the NOR gate 208 is enabled to supply the read enable signal RE2 to energize the switch 58 to couple the serial output of the shift register 44 to the memory system 52. When the contents of the shift register 44 is memorized by the memory sytem 52, the data record complete signal DRC2 is generated by the memory address counter and decoder 51 which is effective to disable the NOR gate 208 to deenergize the switch 58.

The data record complete signal DRC2 constitutes the read enable signal RE3 which is supplied to the switch 60 which is energized thereby to couple the serial output of the shift register 48 to the memory system 52.

Referring to FIG. 12, the memory address clock pulses MAC are generated by the system decoder and control system generator 36 by a NAND gate 212, a NAND gate 214 and a NAND gate 216. The NAND gate 212 functions to generate the memory address clock pulses MAC at a rate equal to the register clock pulses RC1 when the contents of the shift register 42 are being supplied to the memory system 52. This is accomplished by supplying the register clock pulses RC1 to one input of the NAND gate, the write enable signal WE to a second input of the NAND gate and the data record complete signal DRC1 to an inverter 219 whose output is supplied to a third input of the NAND gate 212. The NAND gate 214 functions to cause the NAND gate 216 to supply the memory address clock pulses MAC to the memory address counter and decoder 51 at a frequency equal to the clock signal CLK when the contents of the shift registers 44 and 48 are being supplied to the memory system 52. This is accomplished by supplying the inverse clock signal $\overline{CLK}$, the data record complete signal DRC1 and the write enable signal WE to respective inputs of the NAND gate 214.

Referring to FIG. 13, the memory address counter and decoder 51 includes a counter 218. Simultaneously, with each bit supplied to the memory system 52 from the shift registers 42, 44 or 48, the memory address clock pulses MAC are generated and supplied to the clock input of the counter 218. The counter 218, which was maintained at zero prior to the generation of the write enable signal WE by the output of an inverter 220 having the write enable signal applied to its input, counts the memory address clock pulses MAC and supplies the count in parallel form to a decoder 222 which decodes the count and addresses the memory system 52. In a conventional manner, for illustration purposes, the counter is shown having 12 stages with respective output signals MA0 through MA11.

The memory address counter and decoder 51 generates the data record complete signals DRC1 and DRC2 as shown in FIG. 14. The data record complete signal DRC1 is generated by a NAND gate 224, a NAND gate 226 and a NAND gate 228. The outputs of the NAND gates 224 and 226 are supplied to respective inputs of the NAND gate 228 whose output constitutes the data record complete signal DRC1. The write enable signal WE is supplied to an input of each of the NAND gates 224 and 226 to set the data record complete signal DRC1 initially at ground potential. The NAND gate 224 monitors the output signal MA6, MA8 and MA10 of the respective stages in the counter 218 of FIG. 13, and when those signals are all at a positive voltage level representing that pre and post crash information from the shift register 42 have been memorized by the memory system 52, the NAND gate 228 shifts its output to a positive voltage level whose output is fed back to an input of the NAND gate 226 to provide for a latching function. This signal constitutes the data record complete signal DRC1. The data record complete signal DRC2 is generated by means of NOR gates 230, 232, and 234. The NOR gate 230 monitors the output signals MA3, MA8, MA9 and MA10 of the counter 218 of FIG. 13 and generates an output signal when those signals are at ground level representing, after the data record complete signal DRC1 has been generated, a count indicating that the contents of the shift register 44 have been memorized by the memory system 52. The output of the NOR gate 230 is supplied to an input of the NOR gate 232 whose output is supplied to an input of the NOR gate 234. The NOR gate 234 also receives an input from an inverter 236 whose input is the data record complete signal DRC1 which initially insures that the output of the NOR gate 234 is at ground level until the data record complete signal DRC1 is generated. The output of the NOR gate 234 constitutes the data record complete signal DRC2 which is also fed back to a second input of the NOR gate 232 to provide a latching function. When the data record complete signal DRC1 shifts to a positive voltage, the NOR gate 234 is enabled and when the stages of the counter 218 of FIG. 13 being monitored by the NOR gate 230 supply ground potential at their respective outputs, the data record complete signal DRC2 is generated.

Referring to FIG. 15, the memory address counter and decoder 51 generates the shutdown enable signal SDE to disable the power supply 32 by a NOR gate 238 whose output is coupled to an input of a NOR gate 240.

The output of the NOR gate 240 constitutes the shutdown enable signal SDE which is fed back to an input of the NOR gate 238 to provide a latching function. The write enable signal WE is supplied to the input of an inverter 242 whose output is supplied to an input of the NOR gate 240. The write enable signal WE functions to establish the initial condition of the shutdown enable signal SDE at ground potential. The NOR gate 238 monitors the last stage of the counter 218 and when a count is reached indicating that the contents of the shift register 48 have been memorized by the memory system 52, an output is generated thereby to shift the output of the NOR gate 240 to a positive voltage level. For purposes of illustration, the input to the NOR gate 238 is the output of the 11th stage of the counter 218.

The memory system 52 includes bistable memory elements of a known variety which have a capability of being switched to a given state which is maintained even though no power is applied thereto. An example of such a device is the Ovonic Memory Switch manufactured by Energy Conversion Devices, Inc., 1675 West Maple Road, Troy, Michigan.

If an alternate power supply were coupled to the memory system 52 after a crash and before the power supply 32 was disabled, the memory 52 could take other forms such as a core memory.

Although in the foregoing description of the preferred embodiment of the crash recorder, acceleration and vehicle velocity were monitored and stored in the memory system 52, it will be readily understood by one skilled in the art that other conditions could be monitored such as driver response, brake energization, or other vehicle conditions. In addition, it will be readily understood by one skilled in the art that if the shift registers 42, 44 and 48 were of a non-volatile nature, or means are provided for maintaining power applied thereto after a crash, the memory system 52, the memory address and decoder system 51 and the switches 53, 58 and 60 could be eliminated and the registers 42, 44 and 48 would comprise the memory with the only additional modification being in the extension of the register 42 so that the post-crash information supplied thereto could be memorized while yet maintaining a predetermined amount of information relation to pre-crash information.

The foregoing description of a preferred embodiment for the purpose of illustrating the invention is not to be considered as limiting the scope of the invention as many modifications can be made by one skilled in the art without departing from the scope of the invention.

We claim:

1. A vehicle crash recorder for recording pre and post crash information of a vehicle condition comprising: means responsive to the condition for generating a signal having a magnitude related thereto; means for sampling the magnitude of the signal at specified time intervals; means coupled to the last mentioned means and responsive to each sampling of the signal for generating a digital word comprised of a serial train of a predetermined number of bits representing the magnitude of the sampled signal; means for generating clocking pulses synchronized with the bits in the digital word; a shift register having a number of stages, the shift register being coupled to the means for generating a digital word and means for generating clocking pulses and responsive to the digital word and clocking pulses generated thereby for shifting the bits in the digital words into and out of each of the stages in sequence, the number of stages in the shift register being equal to the number of bits in a predetermined number of digital words; means responsive to a vehicle crash for generating a crash signal; and means coupled to the last mentioned means and the means for generating clocking pulses and responsive to the crash signal for inhibiting the means for generating clocking pulses after said means generates clocking pulses synchronized with the bits in a number of digital words other than the predetermined number of digital words whereby at least a portion of the digital words in the shift register prior to the crash signal provides information relating to pre-crash information of the vehicle condition and at least a portion of the words supplied to the shift register after the crash signal provides post-crash information of the vehicle condition.

2. A vehicle crash recorder for recording pre and post crash information of a vehicle condition comprising: means responsive to the condition for generating a signal having a magnitude related thereto; means for sampling the magnitude of the signal at specified time intervals; means coupled to the last mentioned means and responsive to each sampling of the signal for generating a digital word comprised of a serial train of a predetermined number of bits representing the magnitude of the sampled signal; means for generating clocking pulses synchronized with the bits in the digital word; a shift register having a number of stages, the shift register being coupled to the means for generating a digital word and means for generating clocking pulses and responsive to the digital word and clocking pulses generated thereby for shifting the bits in the digital words into and out of each of the stages in sequence, the number of stages in the shift register being equal to a number of bits in a predetermined number of digital words; a memory circuit; means responsive to a vehicle crash for generating a crash signal; means coupled to said last mentioned means and responsive to the crash signal for coupling the output of the last stage of the shift register to the memory circuit; means coupled to the means for generating a crash signal and responsive to the crash signal for selecting a respective address in the memory circuit for each bit shifted out of the last stage in the shift register; and means for inhibiting the means for generating clocking pulses after said means generates clocking pulses synchronized with the bits in a selected number of digital words greater than the predetermined number of digital words after the vehicle crash, whereby the memory circuit memorizes the predetermined number of digital words representing precrash information of the vehicle condition and memorizes a number of words equal to the selected number representing post-crash information of the vehicle condition.

3. A vehicle crash recorder for recording pre and post crash information of the magnitude of a first vehicle condition and recording precrash information of the magnitude of a second vehicle condition comprising: means for periodically generating a digital word comprised of a serial train of a number of bits representing the magnitude of the first vehicle condition; means for periodically generating a digital word comprised of a serial train of a number of bits representing the magnitude of the second vehicle condition; a first shift register; means for periodically shifting the bits in the digital words representing the magnitude of the first vehicle condition into and out of each stage of the first shift register in sequence, the number of stages in the first shift register being equal to the number of bits in a first predetermined number of digital words representing the first vehicle condition; a second shift register; means for periodically shifting the bits in the digital words representing the magnitude of the second vehicle condition into and out of each of the stages of the second shift register in sequence, the number of stages in the second shift register being equal to the number of bits in a second predetermined number of digital words representing the second vehicle condition; a memory circuit; means responsive to a vehicle crash for generating a crash signal; means responsive to the crash signal for inhibiting the means for periodically shifting the bits in the digital words rerpesenting the magnitude of the second vehicle condition into stages of the second shift register; means responsive to the crash signal for coupling the bits shifted out of the last stage of the first shift register to the memory circuit until a number of digital words in excess of the first predetermined number of digital words is shifted into the first shift register; means for selecting a respective address in the memory circuit for each bit coupled thereto from the first shift register; means for coupling the bits shifted out of the last stage of the second shift register to the memory system after the number of digital words in excess of the first predetermined number of digital words is shifted into the first shift register; means for sequentially shifting the bits contained in the second shift register out of the last stage therein to the memory system; and means for selecting a respective address in the memory system for each bit supplied thereto from the second shift register, whereby the memory system contains pre and post crash information of the first vehicle condition and precrash information of the second vehicle condition.

* * * * *